US012558827B2

(12) United States Patent

Costello

(10) Patent No.: US 12,558,827 B2

(45) Date of Patent: Feb. 24, 2026

(54) PARABOLIC MIXING NOZZLE

(71) Applicant: Government of the United States, as represented by the Secretary of the Army, Washington, DC (US)

(72) Inventor: Leo Andrew Costello, Eldridge, IA (US)

(73) Assignee: Government of the United States, as Represented by the Secretary of the Army, Washington, DC (US)

( * ) Notice: Subject to any disclaimer, the term of this patent is extended or adjusted under 35 U.S.C. 154(b) by 110 days.

(21) Appl. No.: 18/369,945

(22) Filed: Sep. 19, 2023

(65) Prior Publication Data

US 2025/0091268 A1    Mar. 20, 2025

(51) Int. Cl.

| | |
|---|---|
| *B29C 45/20* | (2006.01) |
| *B01F 25/432* | (2022.01) |
| *B01F 25/433* | (2022.01) |
| *B01F 25/46* | (2022.01) |
| *B29C 45/17* | (2006.01) |
| *B33Y 80/00* | (2015.01) |
| *B01F 101/00* | (2022.01) |
| *B29K 105/24* | (2006.01) |

(52) U.S. Cl.
CPC .......... *B29C 45/20* (2013.01); *B01F 25/4323* (2022.01); *B01F 25/4334* (2022.01); *B01F 25/46* (2022.01); *B29C 45/178* (2013.01); *B33Y 80/00* (2014.12); *B01F 2101/2805* (2022.01); *B01F 2215/0431* (2013.01); *B29K 2105/24* (2013.01)

(58) Field of Classification Search
CPC ... B29C 45/20; B29C 45/178; B01F 25/4323; B01F 25/4334; B01F 25/46; B01F 2101/2805; B01F 2215/0431; B33Y 80/00; B29K 2105/24
See application file for complete search history.

(56) References Cited

U.S. PATENT DOCUMENTS

| | | | | |
|---|---|---|---|---|
| 2,985,386 A | * | 5/1961 | Steinen ................... | B05B 1/042 239/597 |
| 6,280,175 B1 | | 8/2001 | Saki et al. | |
| 6,709,262 B2 | | 3/2004 | Fong | |
| 7,544,056 B2 | | 6/2009 | Fairy | |
| 2007/0131715 A1 | * | 6/2007 | Minard ................ | B67D 1/0048 222/145.5 |
| 2016/0288145 A1 | * | 10/2016 | Zumberger ............... | B05B 7/10 |

FOREIGN PATENT DOCUMENTS

| | | | |
|---|---|---|---|
| CN | 2931069 | Y | 8/2007 |
| CN | 106182603 | A | 12/2016 |
| FR | 2867101 | A1 | 9/2005 |
| JP | 1177748 | A | 3/1999 |
| JP | 4792087 | B2 | 10/2011 |

* cited by examiner

*Primary Examiner* — Donnell A Long

(57) ABSTRACT

A parabolic mixing nozzle including a body having an internal flow channel having a well and a plurality of parabolic shaped channels extending through the well and wherein each of the plurality of parabolic shaped channels converge together and open into an exit passage to disrupt the laminar flow of material through the parabolic mixing nozzle and a method of making products using the parabolic mixing nozzle.

13 Claims, 5 Drawing Sheets

PARABOLIC MIXING NOZZLE

GOVERNMENT INTEREST

The invention described herein may be made, used, or licensed by or for the U.S. Government for U.S. Government purposes. The U.S. Government has rights in the invention(s).

TECHNICAL FIELD

The field to which the disclosure generally relates includes nozzles for injection molding rubber products.

BACKGROUND

One or more injection nozzles may be attached to an injection molding machine to direct rubber material into a mold to produce a rubber product.

SUMMARY OF ILLUSTRATIVE VARIATIONS

A number of variations may include a parabolic mixing nozzle comprising a body, wherein the body comprises an internal flow channel defined by a first inner surface of the body, wherein the internal flow channel has a first end portion and a second end portion opposite of the first end portion, wherein the internal flow channel tapers as it extends from the first end portion to the second end portion, a well positioned within the second end portion of the internal flow channel and defined by a second inner surface of the body; and a plurality of parabolic shaped channels extending through the well and defined by a surface of the well and the inner surface of the body, wherein each of the plurality of parabolic shaped channels have a first end and a second end opposite of the first end, and wherein the second end of each of the parabolic shaped channels converge together and open into an exit passage.

A number of variations may include a method of making rubber products with reduced deformation comprising providing a parabolic mixing nozzle; operatively connecting the parabolic mixing nozzle to an injection molding machine; using the injection molding machine to force an uncured rubber through the parabolic mixing nozzle so that the uncured rubber is forced through an internal channel of the parabolic mixing nozzle and mixing the uncured rubber at a parabolic well in the parabolic mixing nozzle to disrupt a laminar flow of uncured rubber through the parabolic mixing nozzle and forcing the uncured rubber through a plurality of parabolic shaped channels within the parabolic mixing nozzle at a high pressure; forcing the uncured rubber out of the parabolic mixing nozzle and into a mold for a product; and emptying the mold to produce a product having a uniform rate of vulcanization throughout the product.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 5:
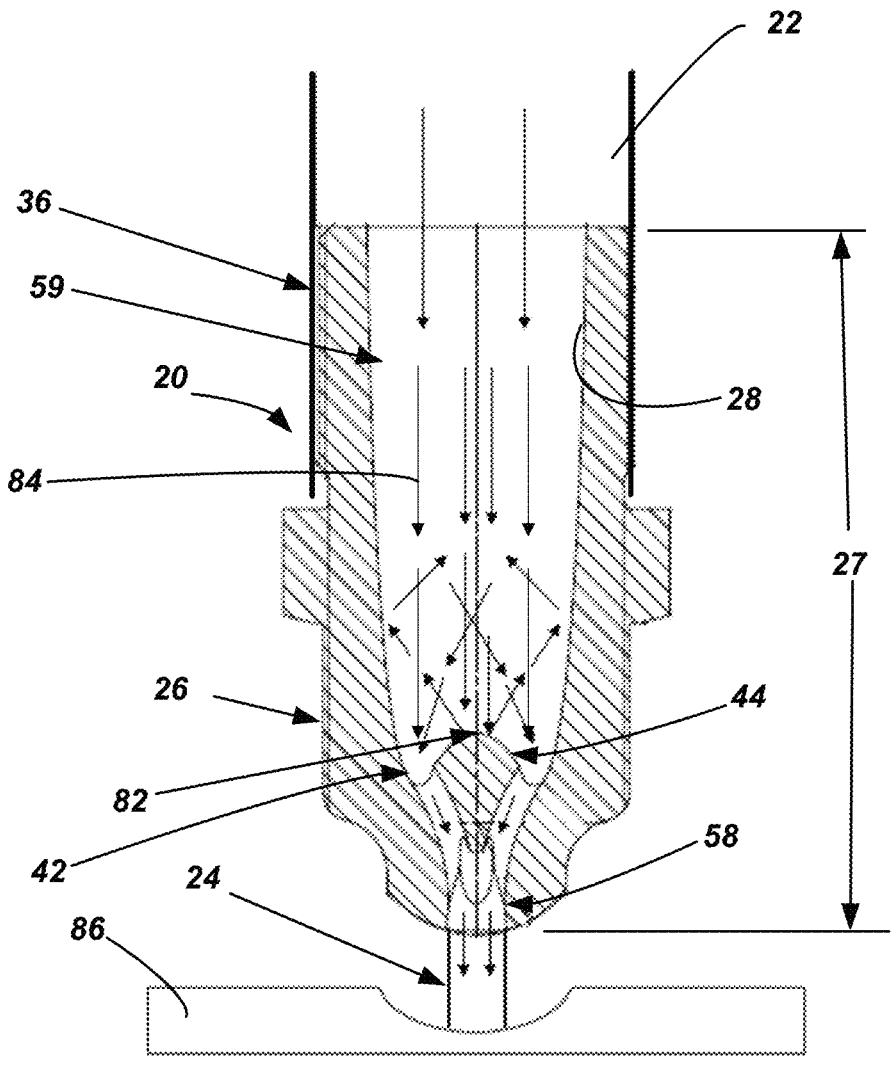
FIG. 5 illustrates a parabolic mixing nozzle attached to an injection molding machine and a flow of material through the parabolic mixing nozzle and into a mold according to a number of variations.

Referring to FIG. 5, in a number of variations, a parabolic mixing nozzle 20 may be operatively connected to an injection molding machine 22 including, but not limited to, a rubber injection molding machine, and may be used for injection molding of rubber products including, but not limited to, obturator pads for artillery. In a number of variations, the parabolic mixing nozzle 20 may reduce and/or eliminate deformation of rubber products being manufactured thereby reducing and/or eliminating the scrap rate by disrupting the laminar flow of uncured rubber 24 being injected through the parabolic mixing nozzle 20 to provide uniform vulcanization of the rubber material.

Figures 1, 2:
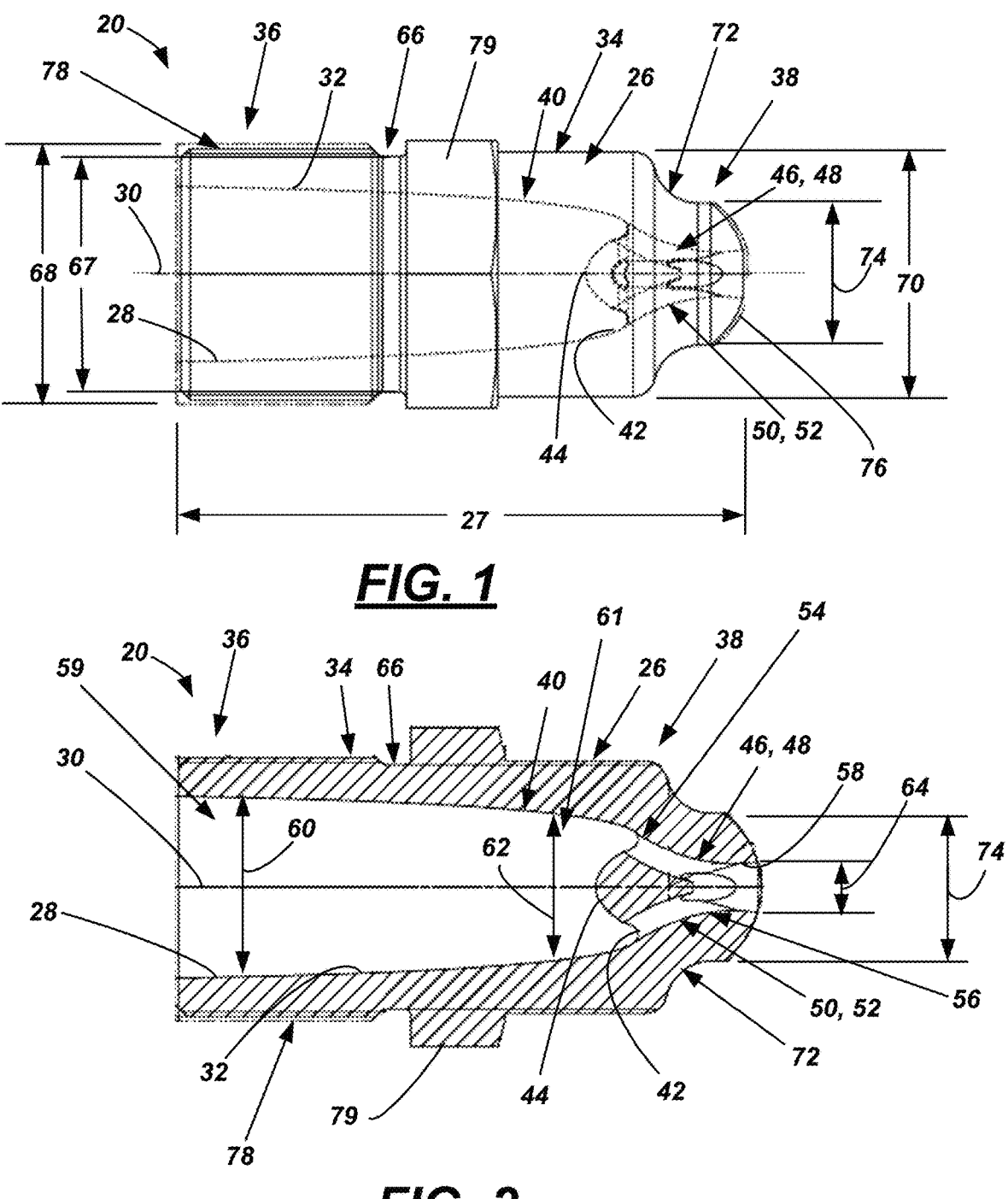
FIG. 1 illustrates a side view of a parabolic mixing nozzle according to a number of variations.
FIG. 2 illustrates a section view of a parabolic mixing nozzle according to a number of variations.

Referring to FIGS. 1 and 2, in a number of variations, the parabolic mixing nozzle 20 may include a body 26 having an inner surface 32 and an outer surface 34. In a number of variations, the body 26 may have a length 27 extending between a first end portion 36 and a second end portion 38 opposite of the first end portion 36. In one variation, the length 27 of the parabolic mixing nozzle 20 may be approximately 80.52 mm.

Referring to FIG. 2, in a number of variations, the body 26 may include an internal flow channel 28 extending along a longitudinal axis 30 of the body 26, which may be defined by an inner surface 32 of the body 26. The internal flow channel 28 may include a first end portion 59 and a second end portion 61 opposite of the first end portion 59. In a number of variations, the internal flow channel 28 may taper 40 as it extends from the first end portion 26 of the body 26 to the second end portion 38 of the body 26.

In a number of variations, a well 42 may be positioned within the second end portion 61 of the internal flow channel 28 and may be defined by an inner surface 32 of the body 26. In a number of variations, the well 42 may include a central parabolic shaped protrusion 44 which may extend outward toward the first end portion 36 of the body 26. In one variation, the central parabolic shaped protrusion 44 may have a focal length 108 of 1.5875 mm, best illustrated in FIG. 6.

Figures 6, 7, 8:
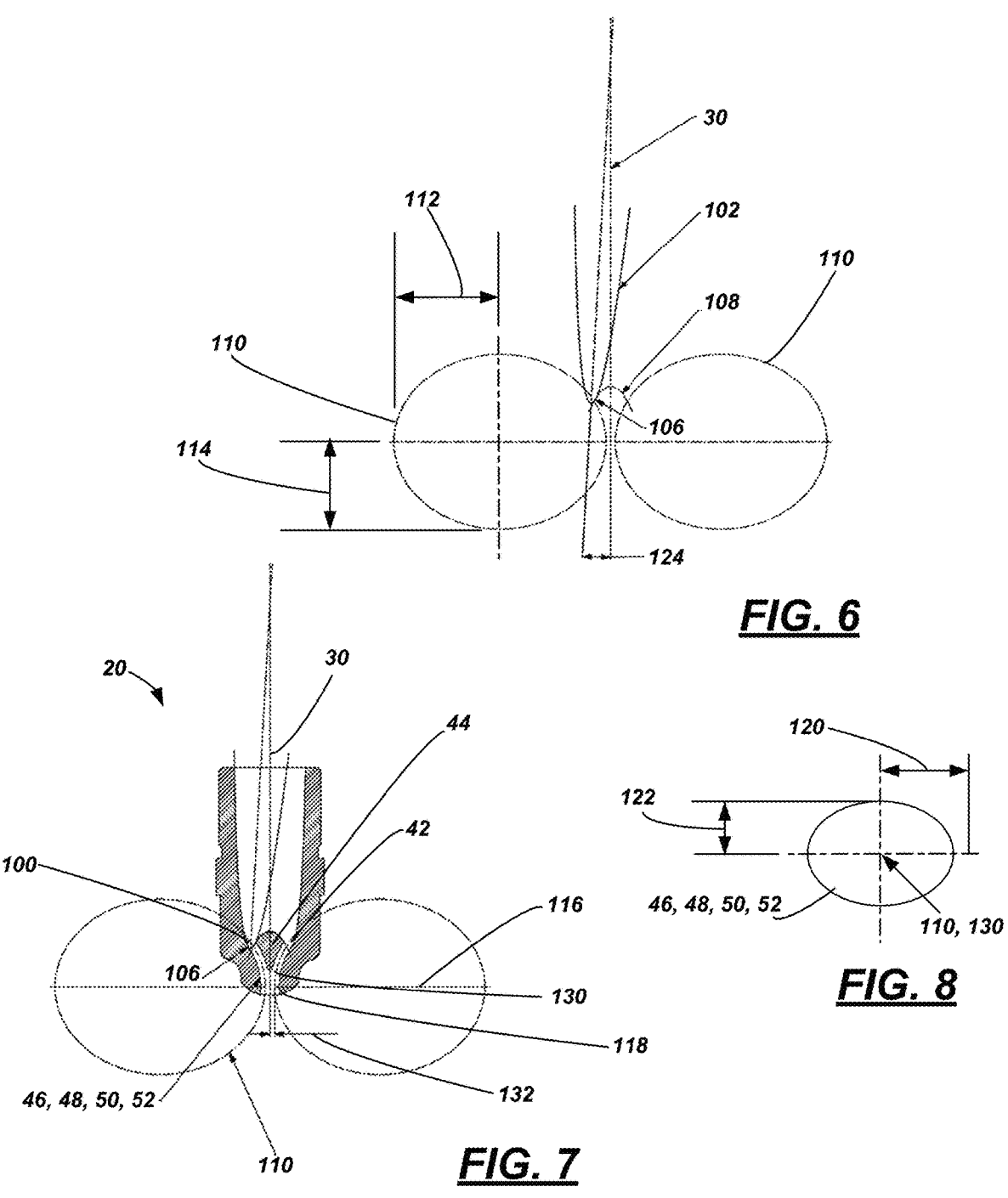
FIG. 6 illustrates a schematic of how a well is formed in the parabolic mixing nozzle according to a number of variations.
FIG. 7 illustrates a section view of a parabolic mixing nozzle and illustrative elliptical paths of the flow channels according to a number of variations.
FIG. 8 illustrates a close-up section view of a parabolic shaped channel according to a number of variations.

Referring to FIG. 7, in a number of variations, the well 42 may be formed by a parabolic groove 100. Referring to FIG. 6, in a number of variations, the parabolic groove 100 may have a focal length 102 of 0.33528 mm positioned at an angle 124 which may be approximately 3.238 degrees from the longitudinal axis 30 of the parabolic mixing nozzle 20. In a number of variations, the depth of the well 42 may then be formed at the tangent point 106 between the parabolic groove 100 and the central parabolic shaped protrusion 44 in the well 42. In one variation, the focal length 108 of the parabolic groove 100 may be 0.33528 mm. In one variation, the focal length 108 of the central parabolic shaped protrusion 44 may be approximately 4.7348 times greater than the focal length 102 of the parabolic groove 100.

Figures 3, 4:
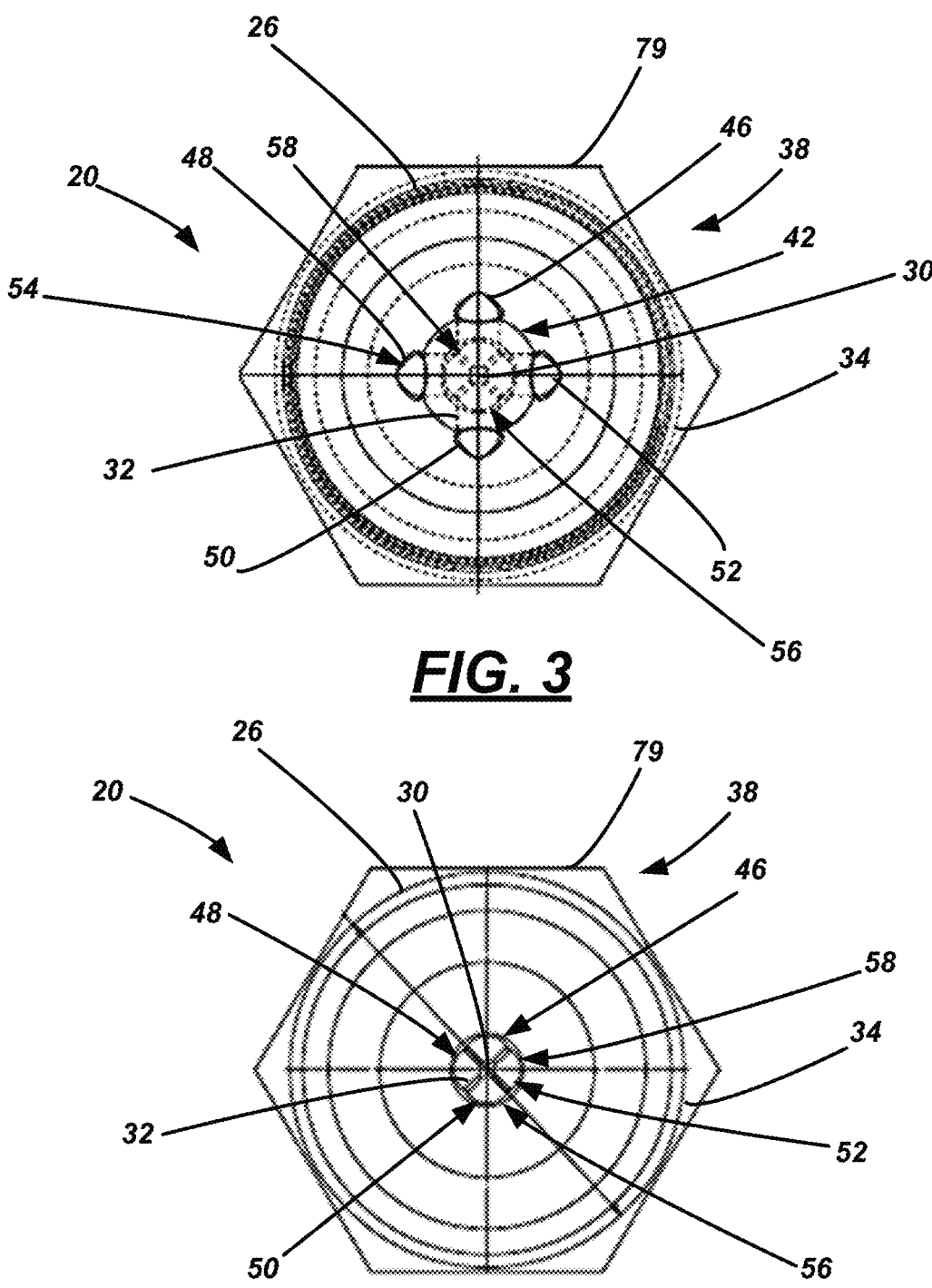
FIG. 3 illustrates a section view of a parabolic mixing nozzle according to a number of variations.
FIG. 4 illustrates an end view of a parabolic mixing nozzle according to a number of variations.

Referring to FIGS. 2-4, in a number of variations, a plurality of parabolic shaped channels 46, 48, 50, 52 may extend through the well 42 toward the second end portion 38 of the body 26 and may be defined by an inner surface 32 of the body 26. In a number of variations, a first end 54 of each of the plurality of parabolic shaped channels 46, 48, 50, 52 may be spaced outward a distance from the longitudinal axis 30. In a number of variations, the plurality of parabolic shaped channels 46, 48, 50, 52 may converge inward toward each other as they extend in a direction away from the first end portion 36 of the body 26 toward the second end portion 38 of the body 26. In a number of variations, the second ends 56 of the plurality of parabolic shaped channels 46, 48, 50, 52 may lead into an exit passage 58 defined within an inner surface 32 of the body 26. In a number of variations, four parabolic shaped channels 46, 48, 50, 52 may be used. In a number of variations, a first end 54 of each of the four parabolic shaped channels 46, 48, 50, 52 may be spaced outward a distance from the longitudinal axis 30 and may be evenly spaced apart from each other 90 degrees about the longitudinal axis 30, a variation of which is illustrated in FIG. 3.

Referring to FIG. 7, in a number of variations, the parabolic channels 46, 48, 50, 52 may be formed within the well 42 by following a plurality of elliptical paths 110, such that the elliptical path 110 may be the center line 130 of the parabolic channel 46, 48, 50, 52. Referring to FIG. 6, in one variation, each of the elliptical paths 110 may have a major radius 112 of 29.21 mm and a minor radius 114 of 35.56. In a number of variations, the minor radius 114 of the elliptical path 110 may be approximately 1.217 times greater than the major radius 112 of the elliptical path 110. Referring to FIG. 7, in a number of variations, the horizontal center line 116 of each of the elliptical paths 110 may be spaced upward approximately 2.84 mm from the end 118 of the parabolic mixing nozzle 20 and the elliptical paths 110 may be spaced a distance 132 approximately 1.611 mm from the longitudinal axis 30 of the parabolic mixing nozzle 20.

Referring to FIG. 8, in a number of variations, each of the parabolic channels 46, 48, 50, 52 may have a major radius 120 of 1.905 mm and a minor radius 122 of 1.5875 mm. In one variation, the major radius 120 of each parabolic channel 46, 48, 50, 52 may be 1.2 times greater than the minor radius 122 of the parabolic channel 46, 48, 50, 52.

Referring again to FIG. 2, in a number of variations, the second end portion 61 of the internal flow channel 28 may have a diameter 62 less than a diameter 60 of the internal flow channel 28 in the first end portion. In a number of variations, the exit passage 58 may have a diameter 64 less than the diameter 60 of the internal flow channel 28 in the first end portion 59 and the diameter 62 of the internal flow channel 28 in the second end portion 61. In one variation, the diameter 60 of the internal flow channel 28 in the first end portion 59 may be 25 mm, the diameter 62 of the internal flow channel 28 at the second end portion 61 may be 20.3 mm, and the diameter 64 of the exit passage 58 may be 7 mm.

Referring to FIG. 1, in a number of variations, the outer surface 34 of the body 26 may include a relief 66 extending between the first end portion 36 of the body 26 and the second end portion 38 of the body 26. In a number of variations, a diameter 67 of the relief 66 may be less than a first diameter 68 of the outer surface 34 at the first end portion 36 of the body 26 and a second diameter 70 of the outer surface 34 at the second end portion 38 of the body 26. In a number of variations, the second end portion 38 of the body 26 may also include a taper 72 such that a third diameter 74 of the outer surface 34 at the second end portion 38 is less than the first diameter 68, the second diameter 70, and the diameter 67 of the relief 66. In a number of variations, the first diameter 68 may be 37 mm, the second diameter 70 may be 35 mm, the third diameter 74 may be 20.3 mm, and the diameter 67 of the relief 66 may be 33.6 mm. In a number of variations, the second end portion 38 of the body 26 may include a curved end 76.

It is noted that the above dimensions of the parabolic mixing nozzle 20 are provided for illustrative purposes and to establish the ratios of the parabolic features. However, the size of the parabolic mixing nozzle 20 may vary beyond the listed dimensions, depending on the size requirements of each injection machine the parabolic mixing nozzle 20 would be used on, provided the ratios of the parabolic features remain constant.

Referring to FIGS. 1-4, in a number of variations, the outer surface 34 of the parabolic mixing nozzle 20 may include one or more mating features 78 which may be used to operatively attach the parabolic mixing nozzle 20 to an injection molding machine 22. In one variation, the mating feature 78 may include a threaded portion on the outer surface 34 of the body 26 which may be used to screw the parabolic mixing nozzle 20 to a mating feature on the injection molding machine 22 (not illustrated). A variation of the threaded portion on the outer surface 34 of the body 26 is shown for illustrative purposes, however, the threaded portion may alternately be on an inner surface 32 of the parabolic mixing nozzle 20, not illustrated.

Referring to FIGS. 1, 3, and 4, in a number of variations, the outer surface 34 of the body 26 may also include a hexagonal protrusion 79 which may extend outward from the outer surface 34 of the body 26, approximately central of the length 27 of the parabolic mixing nozzle 20, and adjacent to the relief 66. In a number of variations, the hexagonal protrusion 79 may act as a stop for the mating feature 78.

A threaded mating feature is discussed above for illustrative purposes, however, any number of mating features may be used to attach the nozzle to the injection molding machine including, but not limited to, wedge lock, set screw, spring-backed steel ball, and/or special socket head screw.

In a number of variations, the parabolic mixing nozzle 20 may comprise metal and may be one single and continuous component. In a number of variations, the parabolic mixing nozzle may be 3D printed.

Referring to FIG. 5, in a number of variations, the first end portion 36 of the body 26 of the parabolic mixing nozzle 20 may be operatively secured to a rubber injection molding machine 22 which may produce a rubber material 24 including, but not limited to, an uncured rubber. In one variation, the parabolic mixing nozzle 20 may be threaded onto a mating threaded portion (not illustrated) on the rubber injection molding machine 22. In a number of variations, the parabolic mixing nozzle 20 may be operatively secured to the rubber injection molding machine 22 such that a length 27 of the parabolic mixing nozzle 20 extends vertically from the rubber injection molding machine 22. In a number of variations, the first end portion 59 of the internal flow channel 28 may be constructed and arranged to receive the rubber material 24. In a number of variations, the exit passage 58 of the parabolic mixing nozzle 20 may be adjacent to a mold 86 for a product so that the rubber material 24 coming out of the parabolic mixing nozzle 20 is directed into the mold 86 for a product.

Referring again to FIG. 5, in a number of variations, the rubber injection molding machine 22 may be operated to inject the rubber material 24 into the parabolic mixing nozzle 20 at a high speed. In a number of variations, the rubber material 24 may be forced through the internal flow channel 28 such that the flow 84 of the rubber material 24 hits the focal point 82 of the central parabolic shaped protrusion 44 of the well 42 causing the flow 84 of the rubber material 24 to be pushed back up and mixed, disrupting the laminar flow of the rubber material 24, before being forced through the plurality of parabolic shaped channels 46, 48, 50, 52 at a high pressure and out of the parabolic mixing nozzle 20 into the mold 86. Disrupting the laminar flow of the rubber material 24 may provide a uniform rate of vulcanization throughout the molded product (not illustrated). In a number of variations, the flow of rubber material 84 through the parabolic mixing nozzle 20 may create a dimensionally accurate rubber product while maintaining material integrity throughout the product.

Figure 9:
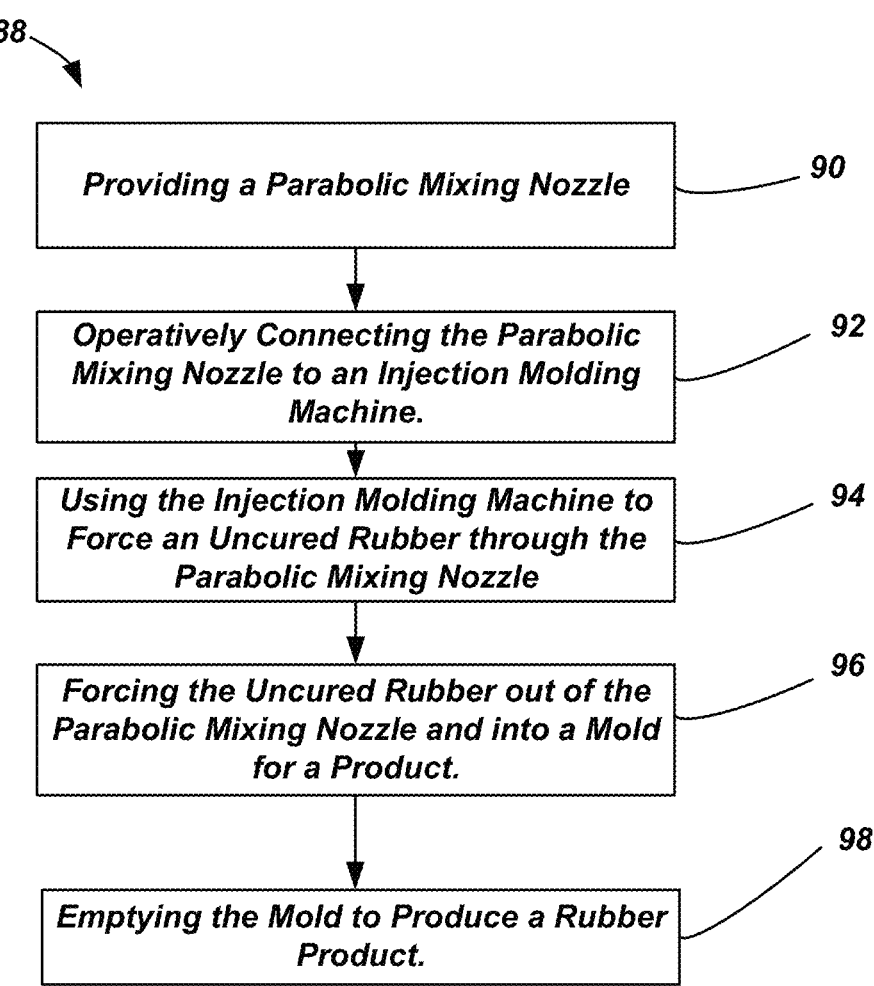
FIG. 9 illustrates a method of making a rubber product according to a number of variations.

FIG. 9 illustrates a method 88 of making a rubber product using a parabolic mixing nozzle 20. In a number of variations, a first step 90 may include providing a parabolic mixing nozzle 20. In a number of variations, a second step 92 may include operatively connecting the parabolic mixing nozzle 20 to a rubber injection molding machine 22. In a number of variations, a third step 94 may include using the rubber injection molding machine 22 to force an uncured rubber 24 through the parabolic mixing nozzle 20. In a number of variations, a fourth step 96 may include forcing the uncured rubber 24 out of the parabolic mixing nozzle 20 and into a mold 86 for a product. In a number of variations, a fifth step 98 may include emptying the mold 86 to produce a rubber product.

The following description of variants is only illustrative of components, elements, acts, products, and methods considered to be within the scope of the invention and are in no way intended to limit such scope by what is specifically disclosed or not expressly set forth. The components, elements, acts, products, and methods as described herein may be combined and rearranged other than as expressly described herein and still are considered to be within the scope of the invention.

Variation 1 may include a parabolic mixing nozzle comprising: a body, wherein the body comprises: an internal flow channel defined by a first inner surface of the body, wherein the internal flow channel has a first end portion and a second end portion opposite of the first end portion, and wherein the internal flow channel tapers as it extends from the first end portion to the second end portion; a well positioned within the second end portion of the internal flow channel and defined by a second inner surface of the body; and a plurality of parabolic shaped channels extending through the well and defined by a surface of the well and the inner surface of the body, wherein each of the plurality of parabolic shaped channels have a first end and a second end opposite of the first end, and wherein the second end of each of the parabolic shaped channels converge together and open into an exit passage.

Variation 2 may include a parabolic mixing nozzle as set forth in Variation 1, wherein the well includes a central parabolic shaped protrusion which extends outward toward the first end portion.

Variation 3 may include a parabolic mixing nozzle as set forth in any of Variations 1-2, wherein the well is defined by a parabolic groove positioned at an angle from a longitudinal axis of the parabolic mixing nozzle and a depth of the well is formed at a tangent point between the parabolic groove and the central parabolic shaped protrusion.

Variation 4 may include a parabolic mixing nozzle as set forth in any of Variations 1-3, wherein the parabolic groove has a first focal length and the central parabolic shaped protrusion has a second focal length, and wherein the second focal length is 4.7348 times greater than the first focal length.

Variation 5 may include a parabolic mixing nozzle as set forth in any of Variations 1-4, wherein the plurality of parabolic shaped channels comprises a first parabolic shaped channel, a second parabolic shaped channel, a third parabolic shaped channel, and a fourth parabolic shaped channel.

Variation 6 may include a parabolic mixing nozzle as set forth in any of Variations 1-5, wherein the first parabolic shaped channel, the second parabolic shaped channel, the third parabolic shaped channel, and the fourth parabolic shaped channel are spaced equally from each other.

Variation 7 may include a parabolic mixing nozzle as set forth in any of Variations 1-6, wherein the first parabolic shaped channel, the second parabolic shaped channel, the third parabolic shaped channel, and the fourth parabolic shaped channel each follow an elliptical path having a major radius and a minor radius, and wherein the minor radius is 1.217 times greater than the major radius.

Variation 8 may include a parabolic mixing nozzle as set forth in any of Variations 1-7, wherein the plurality of parabolic shaped channels each have a major radius and a minor radius, and wherein the major radius is 1.2 times greater than the minor radius.

Variation 9 may include a parabolic mixing nozzle as set forth in any of Variations 1-8, wherein the body has a length of 80.52 mm, the internal flow channel has a diameter that ranges from 20.3 mm to 25 mm, and the exit passage has a diameter of 7 mm.

Variation 10 may include a parabolic mixing nozzle as set forth in any of Variations 1-9, wherein the parabolic mixing nozzle further comprises a mating feature constructed and arranged to attach to an injection molding machine.

Variation 11 may include a parabolic mixing nozzle as set forth in any of Variations 1-10, wherein the mating feature comprises a threaded portion constructed and arranged to mate with a threaded portion on an injection molding machine.

Variation 12 may include a parabolic mixing nozzle as set forth in any of Variations 1-11, wherein the body comprises metal.

Variation 13 may include a parabolic mixing nozzle as set forth in any of Variations 1-12, wherein the body is a single continuous component.

Variation 14 may include a method of making rubber products comprising: providing a parabolic mixing nozzle; operatively connecting the parabolic mixing nozzle to an injection molding machine; using the injection molding machine to force a rubber material through the parabolic mixing nozzle so that the rubber material is forced through an internal channel of the parabolic mixing nozzle and mixing the rubber material at a parabolic well in the parabolic mixing nozzle to disrupt a laminar flow of the rubber material through the parabolic mixing nozzle and forcing the rubber material through a plurality of parabolic shaped channels within the parabolic mixing nozzle at a high pressure; forcing the rubber material out of the parabolic mixing nozzle and into a mold for a product; and emptying the mold to produce a rubber product having a uniform rate of vulcanization throughout the product.

Variation 15 may include a method as set forth in Variation 14, wherein the parabolic well includes a central parabolic shaped protrusion which extends outward toward a first end portion of the parabolic mixing nozzle.

Variation 16 may include a method as set forth in any of Variations 14-15, wherein the plurality of parabolic shaped channels comprises a first parabolic shaped channel, a second parabolic shaped channel, a third parabolic shaped channel, and a fourth parabolic shaped channel.

Variation 17 may include a method as set forth in any of Variations 14-16, wherein the first parabolic shaped channel, the second parabolic shaped channel, the third parabolic shaped channel, and the fourth parabolic shaped channel are spaced equally from each other.

Variation 18 may include a method as set forth in any of Variations 14-17, wherein operatively connecting the parabolic mixing nozzle to the injection molding machine comprises screwing a threaded portion of the parabolic mixing nozzle to a mating threaded portion on the injection molding machine.

Variation 19 may include a method as set forth in any of Variations 14-18, further comprising 3D printing the parabolic mixing nozzle.

The above description of select variations within the scope of the invention is merely illustrative in nature and, thus, variations or variants thereof are not to be regarded as a departure from the spirit and scope of the invention.

What is claimed is:

1. A parabolic mixing nozzle comprising:

a body, wherein the body comprises:

an internal flow channel defined by a first inner surface of the body, wherein the internal flow channel has a first end portion and a second end portion opposite of the first end portion, and wherein the internal flow channel tapers as it extends from the first end portion to the second end portion;

a well positioned within the second end portion of the internal flow channel and defined by a second inner surface of the body; and a plurality of parabolic shaped channels extending through the well and defined by a surface of the well and the inner surface of the body, wherein each of the plurality of parabolic shaped channels have a first end and a second end opposite of the first end, and wherein the second end of each of the parabolic shaped channels converge together and open into an exit passage.

2. The parabolic mixing nozzle of claim 1, wherein the well includes a central parabolic shaped protrusion which extends outward toward the first end portion.

3. The parabolic mixing nozzle of claim 2, wherein the well is defined by a parabolic groove positioned at an angle from a longitudinal axis of the parabolic mixing nozzle and a depth of the well is formed at a tangent point between the parabolic groove and the central parabolic shaped protrusion.

4. The parabolic mixing nozzle of claim 3, wherein the parabolic groove has a first focal length and the central parabolic shaped protrusion has a second focal length, and wherein the second focal length is 4.7348 times greater than the first focal length.

5. The parabolic mixing nozzle of claim 1, wherein the plurality of parabolic shaped channels comprises a first parabolic shaped channel, a second parabolic shaped channel, a third parabolic shaped channel, and a fourth parabolic shaped channel.

6. The parabolic mixing nozzle of claim 5, wherein the first parabolic shaped channel, the second parabolic shaped channel, the third parabolic shaped channel, and the fourth parabolic shaped channel are spaced equally from each other.

7. The parabolic mixing nozzle of claim 6, wherein the first parabolic shaped channel, the second parabolic shaped channel, the third parabolic shaped channel, and the fourth parabolic shaped channel each follow an elliptical path having a major radius and a minor radius, and wherein the minor radius is 1.217 times greater than the major radius.

8. The parabolic mixing nozzle of claim 1, wherein the plurality of parabolic shaped channels each have a major radius and a minor radius, and wherein the major radius is 1.2 times greater than the minor radius.

9. The parabolic mixing nozzle of claim 1, wherein the body has a length of 80.52 mm, the internal flow channel has a diameter that ranges from 20.3 mm to 25 mm, and the exit passage has a diameter of 7 mm.

10. The parabolic mixing nozzle of claim 1, wherein the parabolic mixing nozzle further comprises a mating feature constructed and arranged to attach to an injection molding machine.

11. The parabolic mixing nozzle of claim 10, wherein the mating feature comprises a threaded portion constructed and arranged to mate with a threaded portion on the injection molding machine.

12. The parabolic mixing nozzle of claim 1, wherein the body comprises metal.

13. The parabolic mixing nozzle of claim 1, wherein the body is a single continuous component.

* * * * *